United States Patent [19]

Zaima

[11] Patent Number: 5,022,943
[45] Date of Patent: Jun. 11, 1991

[54] METHOD OF MAKING THERMOFORMABLY SHAPED FIBREBOARD SANDWICH STRUCTURES

[75] Inventor: Harold H. Zaima, Birmingham, Mich.

[73] Assignee: Eften, Inc., Farmington Hills, Mich.

[21] Appl. No.: 398,543

[22] Filed: Aug. 25, 1989

[51] Int. Cl.⁵ ............................................. B32B 31/20
[52] U.S. Cl. ................................... 156/222; 156/221; 156/245; 52/144; 181/292; 428/116; 493/966
[58] Field of Search ................. 428/116, 118, 73, 180; 156/222, 221, 224, 245; 181/288, 292; 52/144; 493/964

[56] References Cited

U.S. PATENT DOCUMENTS

| | | |
|---|---|---|
| 2,668,327 | 2/1954 | Steele . |
| 2,700,632 | 1/1955 | Ackerlund . |
| 2,704,587 | 3/1955 | Pajak . |
| 2,742,387 | 4/1956 | Giuliani ........................ 428/116 X |
| 3,027,225 | 1/1963 | Cremer et al. . |
| 3,664,906 | 5/1972 | Hartig .............................. 428/116 |
| 3,867,240 | 2/1975 | Doerfling . |
| 3,913,702 | 10/1975 | Wirt et al. ...................... 181/288 X |
| 3,982,057 | 9/1976 | Briggs et al. ..................... 428/73 |
| 4,150,186 | 4/1979 | Kazama . |
| 4,184,905 | 1/1980 | Ogata ............................ 156/222 X |
| 4,249,976 | 2/1981 | Hudson ......................... 428/116 X |
| 4,410,065 | 10/1983 | Harvey . |
| 4,416,716 | 11/1983 | Ichikawa et al. . |
| 4,433,021 | 2/1984 | Riel ............................... 181/292 X |
| 4,479,992 | 10/1984 | Häesker et al. . |
| 4,548,665 | 10/1985 | Morin ........................... 156/245 X |

Primary Examiner—Michael W. Ball
Assistant Examiner—Michele K. Yoder
Attorney, Agent, or Firm—Notaro & Michalos

[57] ABSTRACT

A shaped panel and method of manufacture thereof comprises an open-cell core having multiple cells with cell walls extending perpendicularly to the opposite sides of the core. Linerboard covers one or both sides of the core with thermoplastic resin being provided as adhesive between the core and the one or more linerboards. The resulting sandwich structure is heated and shaped in a mold.

3 Claims, 4 Drawing Sheets

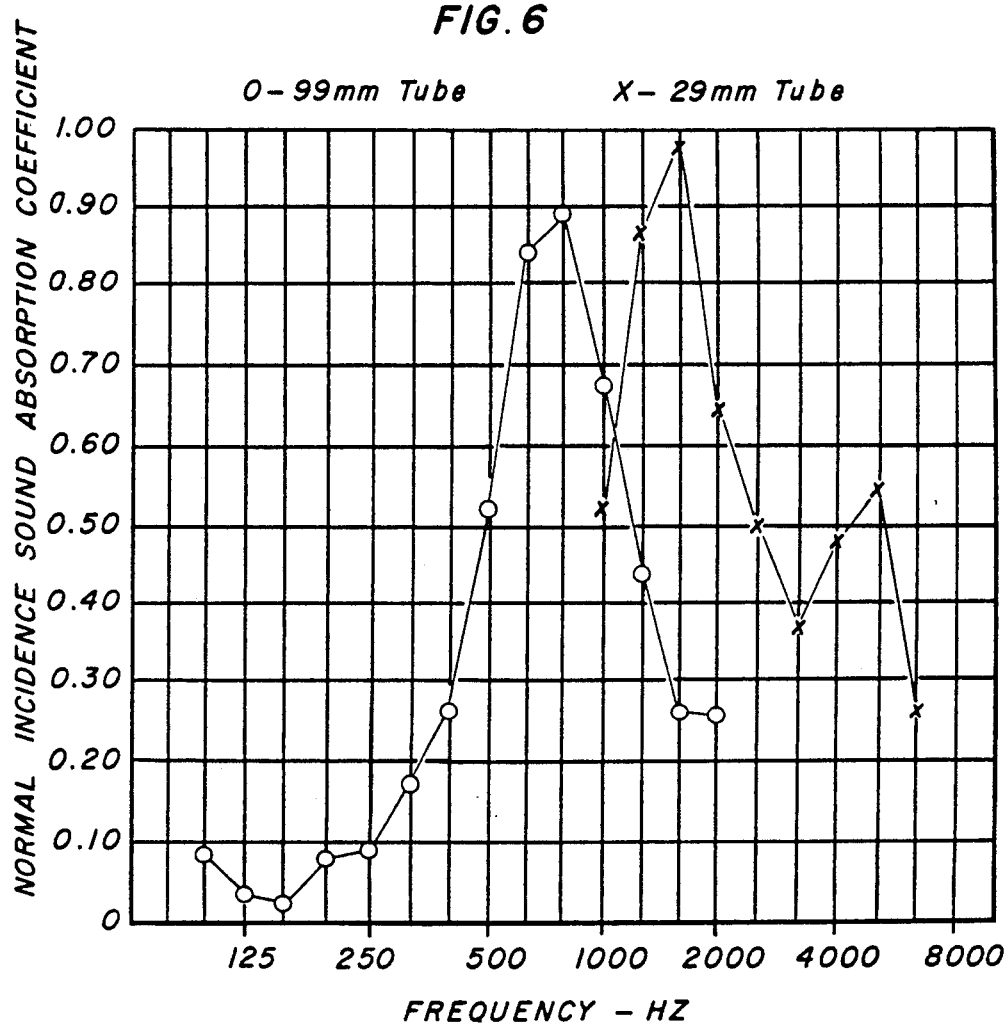

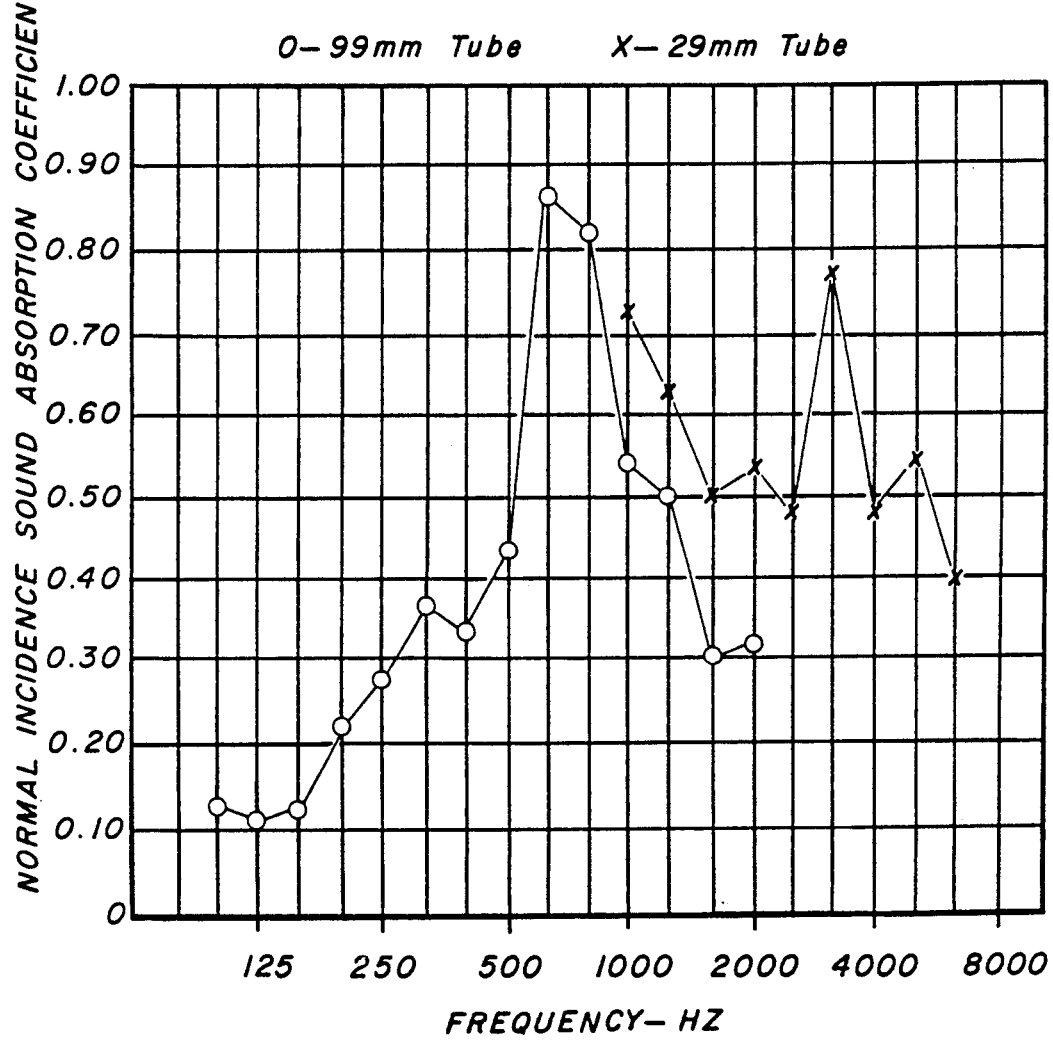

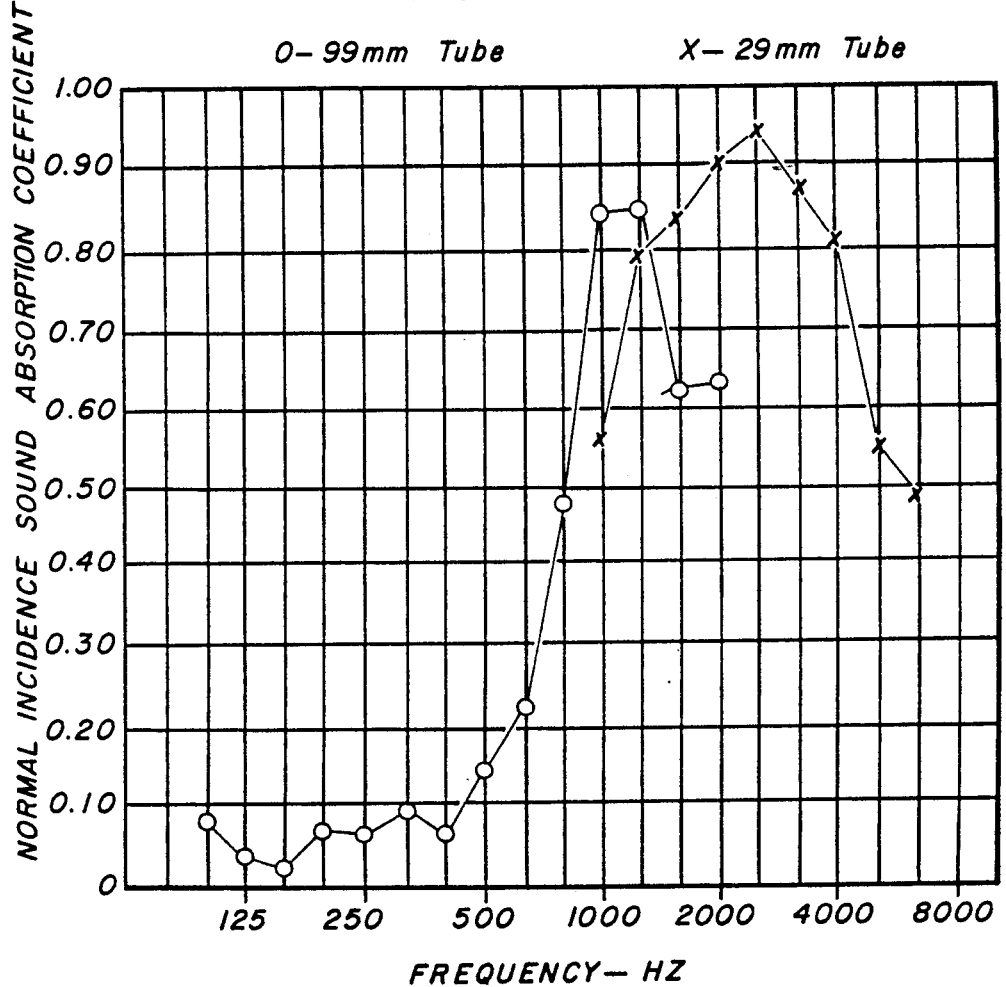

METHOD OF MAKING THERMOFORMABLY SHAPED FIBREBOARD SANDWICH STRUCTURES

BACKGROUND OF THE INVENTION

The present invention relates to composite sandwich structures of the type having a multicellular paper core intermediate and perpendicular facing sheets of linerboard, and more particularly, to a thermoformable composite construction in which an open-cell core is bonded to linerboards with a thermoplastic, to a preform, and to a method of making the construction from the preform.

Composite board sandwich structures with parallel liners and at least one corrugated paper medium have a wide variety of applications. Such elements may be used, for example, as lightweight, interior linings for walls, floors and ceiling panels, as facings, trims and headliners of automotive vehicles and for other applications where heat insulation, sound insulation and absorption and/or dampening of mechanical vibration is required. See, for example, U.S. Pat. No. 4,150,186, 4,170,674, 4,119,451, 4,093,482, 4,124,421, 4,184,905 and 4,242,399. The paper core in such prior art structures are typically adhered to the linerboard with an adhesive agent such as corn starch, PVA and EVA and, therefore, the structures are not thermoformable. Curing temperatures for such structures usually range from 400 to 500 degrees Fahrenheit. One patent, U.S. Pat. No. 4,184,905, discloses a curved flute corrugated board that has a liner, and corrugated paper medium with flutes running parallel to the plane of the liner. A layer of thermoplastic resin is formed between the corrugated medium and the liner such that the corrugated medium is adhered to the inner surface of the liner along the peak of the ridges of the corrugations by the resin layer. Though thermoformable, the product is lacking in bending, torsional, unilateral and compression strength and does not have good acoustic capabilities.

An open cell structure, i.e., a sandwich construction with cells open perpendicularly toward the surface of the liner, is disclosed in U.S. Pat. No. 4,479,992 but this construction is not thermoformable.

SUMMARY OF THE INVENTION

An open cellular paper core, vertical structure in the form of a honeycomb, such as a hexagonal honeycomb cell structure, VERTICEL core (a trade name), ROLL CORE core (a trade name) or other inner open-cell cellular structure (henceforth "honeycomb") is sandwiched between linerboards. The linerboard may be a combination of perforated or imperforate linerboard sheets, i.e., both perforated or one perforated and the other an imperforate, or both imperforate.

In order to facilitate molding, the linerboard on both sides may be loose, one side may be bonded and the other side loose or both sides pre-bonded to the honeycomb before molding. The linerboard sheets are coated with thermoplastic resin which gives the structure a thermoformable characteristic. The pre-bonded liner adheres to the honeycomb medium at respective top regions of its honeycomb surface by extrusion coating during the production process or by using a preextrusion coated linerboard and heating the thermoplastic resin to its softening point, thereby adhering it to the tops of the honeycomb.

The resulting panel can be pressed into a desired shape by using a heated molding press at temperatures which allow the thermoplastic resins to soften. This allows the liners and the honeycomb to slip into the desired shape. Upon lowering the temperature, the resin layer hardens, and the linerboards and honeycomb retain the pressed shape. In the event one or more of the linerboards is not present, a covering material or a backing material of the structure will provide added rigidity.

Due to the low molding temperatures for thermoplastic resins (260–280 degrees F.), covering material such as vinyl, thermoplastic elastomers, cloth, non-woven material, etc. may be added onto the above molded structure in the same molding die, which will, for example, facilitate the processing of a headliner.

The perforations in the linerboard may vary in size and pattern in order to meet the acoustical requirements of the product.

The panel of the present invention is sound and heat insulating and has better bending, torsional, unilateral and compression strength than similar panels made of normal corrugated board. The open-cell medium also provides the panel with sound absorption and sound defracting characteristics. The selective use of perforated and imperforate linerboard allows for the transmission of sound through the perforated linerboard while the imperforate linerboard acts as a sound deadening membrane. This increases sound absorption by allowing the sound to resonate.

The panel of the invention is moldable so that it may be entirely or only partially curved. Both the linerboards and the honeycomb core are subjected to shaping during the molding operation. The panel is also lightweight and economical.

The moldability and heat and sound insulating characteristics of the panels make them particularly useful for modern building construction and for automobiles where curved lines are often required. The panels of the present invention, once molded, retain their shape and remain rigid under temperature variations. These are particularly advantageous characteristics for building, automobile and furniture applications.

In automobiles, the panels of the present invention can be used as headliners, packaging trays (rear shelf), spare tire covers and other interior trim parts. Current trends involve the bonding of a headliner to the roof of an automobile in order to eliminate roof bows. The panels of the present invention are particularly useful in this regard because of their structural strength.

Other applications for the present invention can be found in the furniture and packing industries. The moldability of the present invention at relatively low temperatures permits the use of various decorative skins for furniture and packing applications.

BRIEF DESCRIPTION OF THE DRAWINGS

In the accompanying drawings, forming a part of this specification, and in which reference numerals shown in the drawings designate like or corresponding parts throughout the same.

FIG. 6 is a graph showing the sound absorption characteristics for a panel constructed with the sandwich structure of FIG. 2 and the perforated linerboard facing away from the sound source;

FIG. 7 is a graph showing the sound absorption characteristics of a panel constructed with the sandwich structure of FIG. 1; and FIG. 8 is a graph showing the sound absorption characteristics of a panel constructed with the sandwich structure of FIG. 2 and with the perforated linerboard facing toward the sound source.

DETAILED DESCRIPTION

Figure 1:
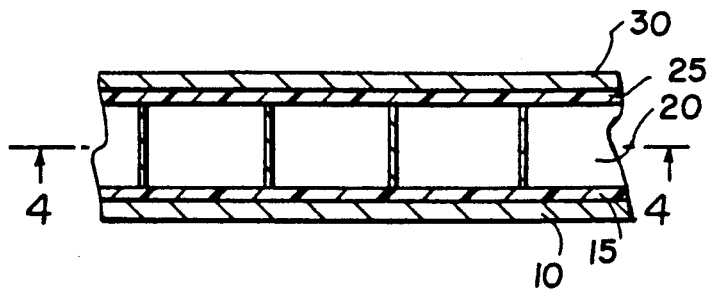
FIG. 1 is a partial sectional view of a sandwich structure with imperforate linerboards according to a first embodiment of the invention.

As shown in FIG. 1, a composite sandwich structure according to the invention includes a multicellular open-cell core 20 which is sandwiched between two linerboards 10, 30 and bonded thereto by a thermoplastic resin 15, 25. The linerboards or liners 10, 30 in the embodiment of FIG. 1 are imperforate. The cells of core 20 are defined by cell walls that extend substantially perpendicularly to the opposite sides of the core.

Figure 2:
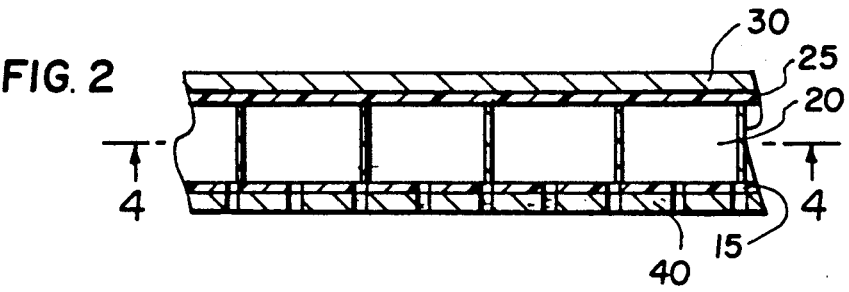
FIG. 2 is a partial sectional view of a sandwich structure with one perforated linerboard according to a second embodiment of the invention.
Figure 3:
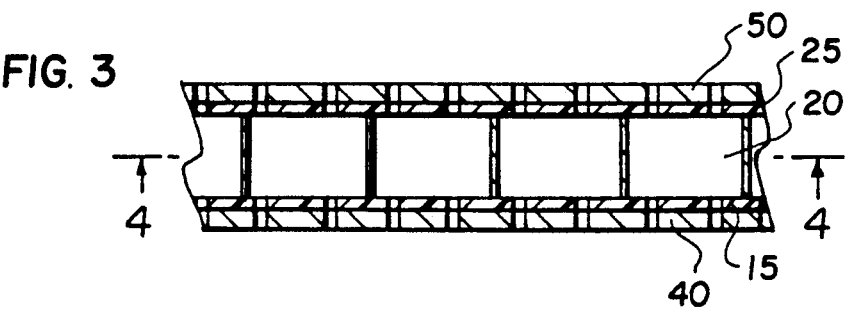
FIG. 3 is a partial sectional view of a sandwich structure with two perforated linerboards according to a third embodiment of the invention.

FIG. 2 illustrates a second embodiment of a composite sandwich structure in which the imperforate liner 10 of the construction of FIG. 1 has been replaced with a perforated liner 40. In the embodiment of FIG. 3, both imperforate liners 10, 30 of the construction of FIG. 1 have been replaced with perforated liners 40, 50.

The open-cell core is typically made of kraft linerboard. Linerboard typically comes in regular kraft and wet strength kraft (water resistant). Also, kraft linerboard comes in different weights (measured in pounds per thousand square feet or MSF). Typically, the heavier the linerboard, the stronger the product. Therefore, the application for the panels of the invention will dictate the weight and the type of kraft linerboard to be used. Semi-chemical kraft which is typically used for corrugated medium can also be used; however, its tensile strength properties are weak and therefore, would not be the preferred material in most cases.

Coatings such as phenolic resins can also be impregnated into the material of the core in order to improve its water resistance and strength. The height or thickness of the core layer is typically about 2.0 mm to about 10.0 mm. The open area of each cell in the core may vary. Typical dimensions across a cell are ¼ inch, ⅜ inch or ½ inch. The pitch between cells is uniform in the honeycomb core, to the cores of FIGS. 4 and 5. Some known open-cell products, however, utilize varying pitch. This type of open-cell core can also be used for the present invention.

Figure 4:
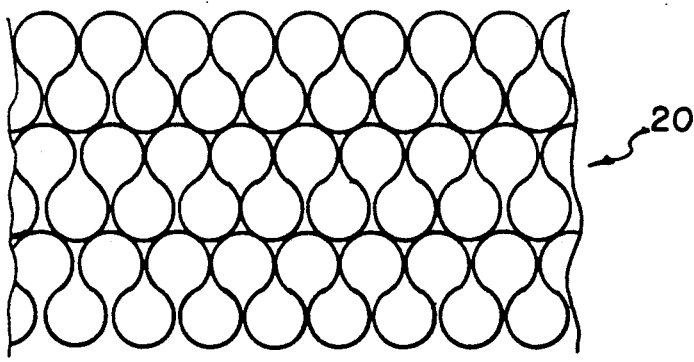
FIG. 4 is a plan view of a section of a certain core material taken along lines 4—4 of FIGS. 1, 2 or 3.

The circular wall pattern core as shown in FIG. 4, comprises cell walls that extend substantially perpendicularly to opposite sides of the core layer, the cell walls lying in circular or FIG. 8 patterns. The undulating wall pattern core shown in FIG. 5, comprises cell walls which extend substantially perpendicularly to the opposite sides of the core layer, the cell walls lying in parallel rows each undulating in one direction then in an opposite direction along the row, the rows being separated by substantially straight additional cell walls.

The choice of which type of cell to use is governed by the requirements of the material, however, since honeycomb (open-cell portion without liners attached), unlike the other two open-cell formats mentioned, does not have a strong structure of its own (it acts like an accordion unless it is bonded to one liner), it would typically not be used for products that requires a deep draw during molding.

In order to accommodate deep draws, it is also advantageous to have one or both liners loose. This will allow the product to draw into the molding dies before it is bonded to the open cell construction. If the draws are shallow then liners can be bonded on one or both sides without difficulty. In this case, the honeycomb structure may be used. The FIG. 5 format is the preferred application, however, depending on the use, other open-cell products may be more advantageous.

The liners also comprise kraft linerboard, i.e., paperboard of the type used as flat facings and may be regular or water resistant. The weight and thickness of the linerboard varies according to the particular application. The linerboard of the invention may have a basic weight in the range of 26 lbs/MSF to 96 lbs/MSF. Caliber may vary from 0.008 inches to 0.026 inches and bursting strength may be in the range of 70 lbs/sq. in. to 175 lbs/sq. in.

In addition, there are a multitude of different linerboards such as fire retardant, fire proof, glass impregnated, wax coated, etc. that can be used in this invention. Typically for automotive headliners, light weight, strong, and noise absorbent products are required. Water resistance may be another advantageous characteristic.

The walls which make up the cells in core 20 are substantially perpendicular to the plane of the linerboards before molding. In accordance with the invention, the top and bottom edges of the cells are adhered to the linerboard by a thermoplastic component, i.e., polyethylene or polypropylene.

The linerboard may be either pre-bonded to one or both sides of the core into a fixed preform before the composite structure is thermally molded into a desired shape, or, alternatively, the linerboard may be pre-extrusion coated and loosely associated with one or both sides of the core. In a further alternative, loose linerboard and loose thermoplastic film can be initially fixed to the core, for example, by taping, adhering or in other ways known in the art.

Linerboard which is pre-coated with thermoplastic is typically used in conjunction with the core. To pre-coat the linerboard, thermoplastic is heat laminated or extrusion coated onto the linerboard. This process is well known in the plastics industry. Backing or covering material can also be used in conjunction with the linerboards. Backing material can be needle punched felt, resinated felt, polyurethane/ester/ ether foam pad and the like. These are typically used to dampen incoming sound and, when the invention is used as an automotive headliner, to dampen the drumming noise caused by rain and other exterior noises. Covering material is typically foam backed cloth. Vinyl, thermoplastic elastomer or other material can also be used.

The extent of sound absorbing characteristics of the panel, in accordance with the present invention, govern whether perforated linerboard is used or not.

Perforated linerboard improves the noise absorption of the panel. It actually allows the product to pass the sound through this linerboard. A headliner is one of the soft interior trims of the car that has a large amount of surface area and, therefore, absorption becomes important.

Usually, one linerboard of the panel will be perforated in order to improve acoustic performance. The panel of the invention has been tested with the perforated side toward a sound source and away from a sound source. Interestingly, the panel performed better when the holes were toward the sound source which would correspond to the exterior of an automobile when using the inventive panel as headliner.

FIGS. 6, 7 and 8 show the results of tests which were conducted to determine the acoustic characteristics of the present invention. In each of FIGS. 6, 7 and 8, the sound absorption co-efficient is plotted against frequency. Tests were made using a Bruel & Kjaer Type 4002 Standing Wave Apparatus. The sound absorption co-efficient was measured for sound normally incident on the test sample generally in accordance with the test method of ASTM C384-58 (1972) "Impedance And Absorption Of Acoustical Materials By The Tube Method."

The results for a 99 mm tube and for a 29 mm tube are shown in each graph.

Figure 5:
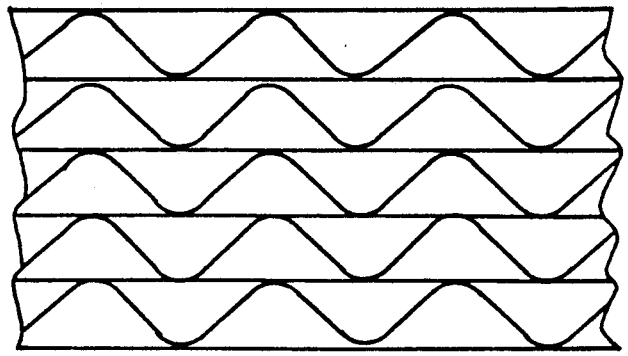
FIG. 5 is a plan view, on a reduced scale, of a further core which may be used in lieu of the core of FIG. 4.

FIG. 6 shows the results of a panel having a core of FIG. 5, a perforated linerboard facing away from the source of sound and an imperforate linerboard on the opposite side of the core. The test was conducted with a 10 mm air space between the perforated linerboard and a back plate in the testing apparatus.

FIG. 7 illustrates the results using a similar sample as in FIG. 6 but with no perforations in the linerboard on either side of the core.

FIG. 8 illustrates the results on a similar sample this time having a perforated linerboard facing the sound source. As with the tests of FIGS. 6 and 7, a 10 mm air space was maintained between the back surface of the panel and the back plate of the testing apparatus. Comparing FIGS. 6 and 8 reveals the different acoustic effects which are achieved depending on which direction the perforated linerboard is facing.

To mold the sandwich structure of FIGS. 1, 2 or 3, the structure is placed between an upper and lower die having complimentary surfaces for shaping the sandwich structure into the desired panel shape. One or both of the dies are heated, to a temperature at or somewhat above the melting temperature for the thermoplastic. The dies are then moved together to form the panel. The dies are held closed typically for approximately 30 seconds. The die may then be opened to receive backing or covering materials. Thereafter the die is again closed to seal the backing or covering material to the panel. The panel may then be removed from the dies. The panel is subsequently cut to size.

In general, the same techniques which are used for molded panels having corrugated cores can be used for molding the panels of the present invention. See, for example, U.S. Pat. No. 4,124,421 or U.S. Pat. No. 4,249,983.

For the molding operation, it is preferable to have one of the linerboards fixed through the thermoplastic to one side of the core and the other linerboard held loosely against the opposite side of the core. To maintain the correct association between the core and the loose linerboard, the loose linerboard may be connected at one edge to the core.

The invention claimed is:

1. A method of manufacturing a rigid shaped panel comprising:
   providing an open-cell paper core layer having a plurality of cells defined by cell walls extending substantially perpendicularly to opposite sides of the core layer;
   covering one side of the core layer with a first paper linerboard which extends substantially perpendicularly to the cell walls of the core layer;
   covering an opposite side of the core layer with a second paper linerboard which extends substantially perpendicularly to the cell walls of the core layer;
   providing a layer of thermoplastic resin between each of the linerboards and the core layer;
   pre-bonding the first linerboard to the core layer through the layer of thermoplastic resin between the first linerboard and the core layer, using heat, the second linerboard remaining unbonded to the core layer but covering the core layer with the layer of thermoplastic resin between the second linerboard and the core layer, the first linerboard, core layer and second linerboard remaining planar;
   subsequently to the pre-bonding, reheating and shaping the first linerboard, the core layer, the layers of thermoplastic resin and the second linerboard into a shaped panel, in a mold, the reheating causing the layer of thermoplastic resin which pre-bonded the first linerboard to the core layer to melt for allowing the first linerboard to slip with respect to the core layer during shaping of the panel;
   one of said first and second linerboards being perforated and the other of said first and second linerboards being imperforate; and
   allowing the shaped panel to cool to bond the linerboards to the core layer and to form a rigid shaped panel.

2. A method according to claim 1, wherein the core layer is selected from the group consisting of honeycomb core, undulating wall pattern core and circular wall pattern core layers.

3. A method according to claim 1, wherein the first linerboard is imperforate and the second linerboard is perforated.

* * * * *